United States Patent [19]

Hütte

[11] Patent Number: 5,969,028
[45] Date of Patent: *Oct. 19, 1999

[54] PROCESS FOR THE PROTECTION OF ELASTANE FIBRES

[75] Inventor: Stephan Hütte, Köln, Germany

[73] Assignee: Bayer Aktiengesellschaft, Leverkusen, Germany

[ * ] Notice: This patent is subject to a terminal disclaimer.

[21] Appl. No.: 08/969,506

[22] Filed: Nov. 13, 1997

[30] Foreign Application Priority Data

Nov. 18, 1996 [DE] Germany .......................... 196 47 572

[51] Int. Cl.⁶ ................................ C08J 3/00; C08K 3/20; C08K 3/10; C08L 75/00
[52] U.S. Cl. .......................... 524/436; 524/401; 524/424; 524/437; 524/443; 524/444; 524/450; 524/589; 524/590
[58] Field of Search ..................... 524/401, 424, 524/436, 437, 443, 444, 450, 589, 590

[56] References Cited

U.S. PATENT DOCUMENTS 5,447,969  9/1995  Kojima et al. .......................... 523/200
5,512,059  4/1996  Ido et al. ................................. 8/115.7

FOREIGN PATENT DOCUMENTS

0489395 A1  6/1992  European Pat. Off. ........ D06P 1/651
0558758 A1  9/1993  European Pat. Off. ........ C08L 75/04

OTHER PUBLICATIONS

Derwent Abstract of Japan 59133248 (Jul. 31, 1984).
Derwent Abstract of Japan 03292364 (Dec. 24, 1991).

Primary Examiner—Patrick D. Niland

[57] ABSTRACT

This invention relates to the protection of polyurethane compositions and especially of elastic polyurethane fibers produced therefrom against destruction or degradation by dry cleaning agents based on halogenated or non-halogenated hydrocarbons, in particular on tetrachloroethylene (perchlor), as are used for dry cleaning textiles. This invention in particular relates to the use of hydrotalcites and/or other metal aluminium hydroxy compounds which are coated with anionic surfactants, fatty acids, silanes, polyorganosiloxanes, polyorganohydrogensiloxanes or higher fatty acid esters or are uncoated as additives to polyurethane compositions and especially polyurethane fibers produced therefrom to provide protection against degradation or destruction by the hydrocarbons.

11 Claims, No Drawings

PROCESS FOR THE PROTECTION OF ELASTANE FIBRES

This invention relates to the protection of polyurethane compositions and especially of elastic polyurethane fibres produced therefrom against destruction or degradation by dry cleaning agents based on halogenated or non-halogenated hydrocarbons, in particular on tetrachloroethylene (perchlor), as are used for dry cleaning textiles, in particular before heat setting fabrics made from elastic elastane fibres and polyamide by warp or circular knitting. This invention in particular relates to the use of coated or uncoated hydrotalcites and/or other metal aluminium hydroxy compounds as additives to polyurethane compositions and polyurethane fibres produced therefrom to provide protection against degradation or destruction.

For the purposes of the present invention, the term "fibre" includes staple fibres and/or continuous filaments which may be produced by per se known spinning processes, such as for example by dry spinning or by wet spinning and by melt spinning.

Elastic polyurethane fibres made from long-chain synthetic polymers synthesised from at least 85% segmented polyurethanes based on, for example, polyethers, polyesters and/or polycarbonates, are well known. Yarns made from such fibres are used for the production of fabrics, woven textiles or materials which, in turn, are suitable inter alia for corsetry, stockings and sports clothing such as swimming costumes or swimming trunks. Before the fabrics, woven textiles or materials used for this purpose are dyed, they must, after processing with synthetic hard fibres, such as polyamide or polyester, or natural fibres, such as cotton, on, for example, a warp or circular knitting machine, have any fibre preparation oils or needle oils removed. This may suitably be achieved by dry cleaning with hydrocarbons or halogenated hydrocarbons, such as tetrachloroethylene (perchlor). If such fabrics, woven textiles or materials are subsequently subjected to heat setting and dyeing, the elastic polyurethane fibres may be damaged, which may go as far as fibre breakage. As a consequence, the fabric, woven textile or material loses its elasticity. Holes may even be formed in the textile material. Fabrics, woven textiles and materials damaged in this manner cannot subsequently be made up and are discarded as waste material.

Resistance to the hydrocarbons conventionally used as cleaning agents in dry cleaning laundries is also of great significance when the finished textiles are dry cleaned.

In practical terms, no fibre breakage of the elastic polyurethane fibres can be tolerated in elastic fabrics, woven textiles or materials. It is thus necessary to improve resistance to destruction brought about by dry cleaning with, for example, chlorinated hydrocarbons, in particular for yarns having a low denier value (for example of less than 300 denier).

No solution to the problem of avoiding elastic fibre destruction by dry cleaning with, for example, tetrachloroethylene, has hitherto been described.

The object underlying the invention is to provide a protective process for polyurethanes or polyurethane fibres in which the polyurethanes, in particular the polyurethane fibres or fabrics, woven textiles or materials containing such polyurethane fibres, may simply be stabilised against destruction or degradation by dry cleaning agents, in particular by tetrachloroethylene.

This object is achieved according to the invention by adding to the polyurethane composition an effective quantity of finely divided hydrotalcites or other metal aluminium hydroxy compounds, which are optionally coated with anionic surfactants, fatty acids, fatty acid salts, silanes, polyorganosiloxanes, polyorgano- hydrogensiloxanes or with other sizing agents or are uncoated.

The present invention provides the use of finely divided hydrotalcite and/or other basic metal aluminium hydroxy compounds, in particular of the general formula (1)

$$M_{1-x}^{2+}Al_x(OH)_2 A_{x/n}^{n-} \cdot mH_2O \quad (1),$$

wherein
$M^{2+}$ denotes magnesium or zinc, in particular magnesium,
$A^{n-}$ is an anion of that valency number from the range comprising $OH^-$, $F^-$, $Cl^-$, $Br^-$, $CO_3^{2-}$, $SO_4^{2-}$, $HPO_4^{2-}$, silicate, acetate or oxalate, in particular $CO_3^{2-}$,
$0 < x \leq 0.5$ and $0 \leq m < 1$ apply,
or in particular of the formula (2)

$$Mg_s Al_t(OH)_u (A^{2-})_v \cdot wH_2O \quad (2),$$

s is a number from 1 to 15,
t is a number from 1 to 8,
u is a number from 1 to 40,
w is a number from 0 to 20 and
v is a number from 0 to 5 and
$A^{2-}$ is an anion from the group comprising $CO_3^{2-}$, $SO_4^{2-}$, $HPO_4^{2-}$, silicate or oxalate, in particular $CO_3^{2-}$, as an additive to polyurethane in a quantity of 0.05 to 30 wt. %, in particular from 0.05 to 15 wt. %, particularly preferably from 0.1 to 5 wt. %, very particularly preferably from 0.3 to 4 wt. %, relative to the polymer, for the production of elastane fibres having elevated resistance to halogenated, partially halogenated or non-halogenated hydrocarbons, in particular to $C_1$ to $C_8$ hydrocarbons, preferably to tetrachloroethylene, tetrachloromethane or trichloroethylene.

The present invention also provides a process for the protection of polyurethane fibres against degradation by halogenated, partially halogenated or non-halogenated hydrocarbons, in particular by tetrachloroethylene, characterised in that, before the polyurethane is processed into fibres as a melt or as a solution of the polyurethane, there is incorporated into it a quantity of 0.05 to 30 wt. %, in particular of 0.05 to 15 wt. %, particularly preferably of 0.1 to 5 wt. %, very particularly preferably of 0.3 to 4 wt. %, relative to the polymer, of finely divided hydrotalcite and/or other basic metal aluminium hydroxy compounds, in particular of the general formula (1)

$$M_{1-x}^{2+}Al_x(OH)_2 A_{x/n}^{n-} \cdot mH_2O \quad (1),$$

wherein
$M^{2+}$ denotes magnesium or zinc, in particular magnesium,
$A^{n-}$ is an anion of that valency number from the range comprising $OH^-$, $F^-$, $Cl^-$, $Br^-$, $CO_3^{2-}$, $SO_4^{2-}$, $HPO_4^{2-}$, silicate, acetate or oxalate, in particular $CO_3^{2-}$,
$0 < x \leq 0.5$ and $0 < m < 1$ apply, or in particular of the formula (2)

$$Mg_s Al_t(OH)_u (A^{2-})_v \cdot wH_2O \quad (2)$$

s is a number from 1 to 15,
t is a number from 1 to 8,
u is a number from 1 to 40,
w is a number from 0 to 20 and
v is a number from 1 to 5 and $A^{2-}$ is an anion from the group comprising $CO_3^{2-}$, $SO_4^{2-}$, $HPO_4^{2-}$, silicate or oxalate, in particular $CO_3^{2-}$.

The hydrotalcites or other metal aluminium hydroxy compounds are preferably uncoated or in particular coated with 0.1 to 30 wt. %, in particular with 0.5 to 25 wt. % of anionic surfactants, fatty acids, fatty acid salts, silanes, polyorgano-siloxanes, polyorganohydrogensiloxanes or with other sizing agents.

For the purposes of the invention, metal aluminium hydroxy compounds are mixed salts based on a divalent metal ion, in particular of Mg or Zn, particularly preferably of Mg, and aluminium as a trivalent cation, the hydroxy anion and another mono- or divalent anion, in particular $OH^-$, $F^-$, $Cl^-$, $Br^-$, $CO_3^{2-}$, $SO_4^{2-}$, $HPO_4^{2-}$, silicate, acetate or oxalate.

The hydrotalcites or metal aluminium hydroxy compounds are particularly preferably those as are shown, for example, in the formulae (3) and (4):

$$Mg_5Al_3(OH)_{15}(A^{2-})_2 \cdot wH_2O \qquad (3),$$

$$Mg_6Al_2(OH)_{12}(A^{2-})_3 \cdot wH_2O \qquad (4),$$

wherein $A^{2-}$ and w have the meaning stated above for the formula 2.

Preferred examples of hydrotalcites or magnesium aluminium hydroxy compounds are those of the formulae (5), (6) and (7):

$$Mg_6Al_2(OH)_{16}CO_3 \cdot 5H_2O \qquad (5),$$

$$Mg_4Al_2(OH)_{12}CO_3 \cdot 4H_2O \qquad (6),$$

$$Mg_6Al_2(OH)_{12}(CO_3)_3 \cdot 7H_2O \qquad (7).$$

Examples of anionic surfactants are metal soaps of higher fatty acids of the formula RCOOM, in which R is an alkyl group having 3 to 40 carbon atoms and M is a metal, in particular an alkali metal or alkaline earth metal, for example Ca or Mg, alkyl sulphates of the formula $ROSO_3M$, in which R and M are as defined above or alkyl sulphonates of the formula $RSO_3M$, in which R and M are again as defined above.

Specific examples are sodium stearate, magnesium stearate, sodium oleate, sodium octadecyl sulphate, sodium lauryl sulphonate, aluminium stearate and zinc stearate.

Examples of fatty acids are mono- or dicarboxylic acids having linear or branched hydrocarbon chains with 3 to 40 carbon atoms. Specific examples are caproic acid, lauric acid, palmitic acid and stearic acid.

Examples of silanes are compounds of the formula $(R'O)_3SiR''$, in which R' and R'' may be identical or different and a linear or branched hydrocarbon chain having 1 to 40 carbon atoms.

Examples of polyorganosiloxanes are compounds of the formula (8)

$$(R^4)_3SiO-(-SiR^1R^3O-)_x-(-SiR^2R^6O-)_y-Si(R^5)_3 \qquad (8),$$

wherein x=0-500 and y=0-300, $R^1$, $R^2$, $R^3$, $R^4$ and $R^5$ mutually independently denote a saturated and/or unsaturated optionally also branched alkyl residue having 1 to 4 C atoms and/or an aryl residue having 6 to 9 C atoms, which may optionally also be alkyl-substituted and $R^6$ denotes an alkyl residue having 6 to 18 C atoms.

Specific examples are polydimethylsiloxanes having a viscosity of 3 to 1000 mPa.s (measured at 25°C.).

Examples of polyorganohydrogensiloxanes are compounds of the formula (9) or (10), $$(R^4)_3SiO-(-SiR^1R^3O-)_x-(-SiR^2R^6O-)_y-(-SiR^7HO-)_z-Si(R^5)_3 \qquad (9),$$

$$(R^2)_3SiO-(-SiR^1HO-)_z-Si(R^3)_3) \qquad (10),$$

wherein x, y, $R^1$, $R^2$, R $R^4$ and $R^5$ have the same meaning as in the formula (8), $R^7$ has the same definition as the residue $R^1$ and z is a number between 1 and 200.

Specific examples are Baysilone-Öl MH 15 (Bayer) or Baysilone-Öl AC 3303 (Bayer).

Preferred hydrotalcites and/or metal aluminium hydroxy compounds are those which are uncoated.

Particularly preferred hydrotalcites and/or metal aluminium hydroxy compounds are those which are coated with 0.05 to 25 wt. %, relative to the quantity of hydrotalcite and/or metal aluminium hydroxy compound, of anionic surfactants, fatty acids, fatty acid salts, silanes, polyorganosiloxanes, polyorganohydrogensiloxanes and/or other coating agents. Those hydrotalcites and/or metal aluminium hydroxy compounds which are coated with 0.5 to 10 wt. % of anionic surfactants, fatty acids, fatty acid salts, silanes, polyorganosiloxanes, polyorganohydrogensiloxanes and/or other coating agents are in particular used.

The hydrotalcites or metal aluminium hydroxy compounds may be coated by spraying and/or mixing in the anionic surfactants, fatty acids, fatty acid salts, silanes, polyorganosiloxanes, polyorganohydrogensiloxanes and/or other coating agents together or separately in any desired sequence preferably before and/or during a subsequent grinding of the hydrotalcites or metal aluminium hydroxy compounds for the production thereof or for establishing preferred grain sizes.

It is immaterial in this connection whether the anionic surfactants, fatty acids, fatty acid salts, silanes, polyorganosiloxanes, polyorganohydrogensiloxanes and/or other coating agents are mixed into the moist filter cakes, pastes or suspensions arising during production of the hydrotalcites or metal aluminium hydroxy compounds before drying, or whether addition is made in a suitable manner, for example by spraying, to the dry material immediately before the subsequent grinding or, in the case of steam-jet drying, to the steam immediately before introduction into the jet mill. The anionic surfactants, fatty acids, fatty acid salts, silanes, polyorgano- siloxanes, polyorganohydrogensiloxanes and/or other coating agents may optionally be converted into an emulsion before addition.

The hydrotalcites or metal aluminium hydroxy compounds are produced, for example, using processes which are known in principle. Such processes are described, for example, in published patent application EP 129 805-Al or in the document EP 117 289-Al.

The hydrotalcites and/or metal aluminium hydroxy compounds are preferably produced from the starting compounds thereof, for example from $MgCO_3$, $Al_2O_3$ and water in the presence of a solvent, such as for example water, alcohol (for example $C_1$—$C_8$ alcohols) or chlorinated hydrocarbons with subsequent drying, for example by spray drying, and grinding by, for example, a bead mill.

The hydrotalcites or metal aluminium hydroxy compounds are particularly preferably coated by grinding with, for example, a bead mill in the presence of solvents such as, for example, dimethylacetamide, dimethylformamide or dimethyl sulphoxide, as may also be used in the production of the polyurethane. The anionic surfactant, the fatty acids, silanes, polyorganosiloxanes, polyorganohydrogensiloxanes and/or other coating agents used for coating may here be added in a suitable manner to the material to be ground or, as already described above, to the hydrotalcite or the metal aluminium hydroxy compounds before or during drying. On grinding, average grain sizes of the coated or uncoated hydrotalcites or metal aluminium hydroxy compounds of an average diameter (number average) of 10 mm are in particular achieved, preferably of less than 5 mm and particularly preferably of less than 2 mm. These grain sizes are achieved by processing the hydrotalcites and/or metal aluminium hydroxy compounds by the processes already described above.

The hydrotalcites or metal aluminium hydroxy compounds may be added to the polyurethane at any desired point during the production of polyurethane fibres. For example, the hydrotalcites or metal aluminium hydroxy compounds may added in the form of a solution or suspension to a solution or dispersion of other fibre constituents and then mixed with or injected into the polymer solution upstream from the fibre spinnerets. The hydrotalcites and/or metal aluminium hydroxy compounds may, of course, also be added separately to the polymer spinning solution as a dry powder or suspension in a suitable medium. The hydrotalcites and/or metal aluminium hydroxy compounds may furthermore be added in the above-stated formulations during polymer production.

The polyurethanes or polyurethane fibres according to the invention may contain numerous different additives for various purposes, such as for example flatting agents, fillers, antioxidants, dyes, colouring agents, stabilisers against heat, light and UV radiation etc., wherein these additives are apportioned in such a manner that they exhibit no counter-effects to the hydrotalcites and/or metal aluminium hydroxy compounds.

If the fabrics, yarns or materials produced from the fibres according to the invention are finished or dyed, particular care must be taken to ensure that deactivation or leaching of the hydrotalcites and/or metal aluminium hydroxy compounds is avoided.

The polyurethanes stabilised by hydrotalcites and/or metal aluminium hydroxy compounds may be used not only for processing into fibres but also for mouldings, films, elastomers, foaming materials etc..

Under certain circumstances, uncoated hydrotalcites and/or metal aluminium hydroxy compounds may agglomerate in polar solvents, such as for example dimethylacetamide, dimethylformamide or dimethyl sulphoxide, which are conventionally used in dry or wet spinning processes for the production of fibres from polyurethanes. As a consequence, in the case of spinning solutions containing incorporated uncoated hydrotalcites and/or metal aluminium hydroxy compounds, disruption to the spinning process may occur which after extended spinning may go as far as causing fibre breakage. When the hydrotalcites and/or metal aluminium hydroxy compounds coated with anionic surfactants, fatty acids, silanes, polyorgano-siloxanes, polyorganohydrogen-siloxanes and/or other coating agents are incorporated into polyurethane solutions, no agglomeration occurs in the spinning solution or in solvent-free polymer melts and the average grain size of the coated hydrotalcites and/or metal aluminium hydroxy compounds remains unchanged. The hydrotalcites and/or metal aluminium hydroxy compounds coated with anionic surfactants, fatty acids, silanes, polyorganosiloxanes, polyorganohydrogensiloxanes and/or other coating agents are thus to be preferred in the stated spinning processes to those which are uncoated.

If, in the process for the protection of polyurethane fibres, less than 0.05 wt. % of the hydrotalcites and/or metal aluminium hydroxy compounds are distributed within the filament or on the filament surface, their effectiveness against degradation or destruction of the polymer by dry cleaning with tetrachloroethylene is unsatisfactory under certain circumstances. Dispersing more than 15 wt. % of the hydrotalcites and/or metal aluminium hydroxy compounds within the filament or on the filament surface may result in disadvantageous physical fibre properties and is thus not advisable.

The polyurethane fibres to be protected according to the invention in particular consist of segmented polyurethane polymers, such as for example those based on polyethers, polyesters, polyether esters or polycarbonates. Such fibres may be produced by processes which are known in principle, such as for example those described in the documents U.S. Pat. Nos. 2,929,804, 3,097,192, 3,428,711, 3,553,290, 3,555,115 or in the document WO 9 309 174. The polyurethane fibres may furthermore consist of thermoplastic polyurethanes, the production of which is described, for example, in the document DE 4 414 327 Al. Some of these polymers are more sensitive than others to degradation brought about by dry cleaning with tetrachloroethylene. Polyurethane fibres made from a polyurethane based on polyethers are particularly sensitive. As a consequence, the process is preferably used on polyurethane fibres based on polyethers.

The hydrotalcites and/or metal aluminium hydroxy compounds are preferably additives which contain no heavy metals and are toxicologically safe and thus preferred. In this manner it may be ensured that, on subsequent processing of the elastane fibres, such as for example dyeing, no wastewater is produced which impairs or destroys the functioning of a biological wastewater treatment plant.

Incorporation of the hydrotalcites and/or metal aluminium hydroxy compounds furthermore ensures, as Example 1 shows, that the thermal properties of the polyurethane fibres, for example the hot breaking time of the resultant elastane fibres, are not changed, even after dry cleaning has been performed using tetrachloroethylene (perchlor washing) as is conventional in the textiles industry or using other typically used halogenated hydrocarbons such as tetrachloromethane, trichloroethylene or chlorofluorocarbons. Stabilisation of the hot breaking time by hydrotalcites and/or metal aluminium hydroxy compounds incorporated into the elastane fibres is independent of coating and of the type of coating of the hydro- talcites and/or metal aluminium hydroxy compounds. Due to the stabilised hot breaking time, it is possible to perform dry cleaning with, for example, tetrachloroethylene (perchlor washing) without destroying fabrics, woven textiles or materials consisting of elastane and polyamide fibres due to fibre breakage of the elastane fibres.

The polyurethanes which may be used as the basic material for elastane fibres, which also include segmented polyurethanes, are essentially in particular produced from a linear homo- or copolymer having a hydroxyl group on each end of the molecule and a molecular weight of 600 to 4000, such as for example polyether diols, polyester diols, polyesteramide diols, polycarbonate diols, polyacrylic diols, polythioester diols, polythioether diols, polyhydrocarbon diols or a mixture or copolymers of this group. The polyurethane is furthermore in particular based on organic diisocyanates and a chain extender having two or more active hydrogen atoms, such as for example di- and polyols, di- and polyamines, hydroxylamines, hydrazines, polyhydrazides, polysemicarbazides, water or a mixture of these components.

The hydrotalcites or metal aluminium hydroxy compounds may be incorporated into the polyurethane compositions together with or separately from other frequently used components, such as for example UV stabilisers, antioxidants, pollutant gas stabilisers, colouring additives, antistatic agents, lubricants, dyes, flatting agents, fillers etc.

The test method described below is used to measure the parameters discussed above.

The change in thermal stability of polyurethane fibres brought about by dry cleaning with tetrachloroethylene is tested by measuring the hot breaking time before and after dry cleaning with tetrachloroethylene. Hot breaking time is determined by bringing a polyurethane fibre extended to 100% into contact with a metal plate (temperature 200° C., size 4×4 cm). The time which elapses until the polyurethane fibre breaks is measured. The polyurethane fibres are dry cleaned with tetrachloroethylene by immersing the polyurethane fibres in a tetrachloroethylene bath at 25° C. for a certain period of time (in this case, 2 minutes) (bath ratio: polyurethane/tetrachloroethylene=1/30 wt. %) and then drying them for 12 hours at 25° C.

The invention is illustrated in greater detail by a non-limiting Example, wherein all percentages are relative to the total weight of the polyurethane fibre.

EXAMPLE

In Example 1, the polyurethane fibres were produced from a polyether diol consisting of polytetrahydrofuran (PTHF) having an average molecular weight of 2000. The diol was capped with methylene bis(4-phenyldiisocyanate) (MDI) at a molar ratio of 1:1.7 and then chain-extended with a mixture of ethylenediamine (EDA) and diethyleneamine (DEA) in dimethylacetamide.

A stock mixture of additives was then mixed into the polymer. This stock mixture consisted of 62.6 wt. % of dimethylacetamide (DMAC), 10.3 wt. % of Cyanox 1790 (American Cyanamid, stabiliser), 27.0 wt. % of 30% spinning solution and 0.001 wt. % of the dye Makrolexviolett (Bayer AG). This stock mixture was added to the spinning solution in such a manner that the content of Cyanox 1790 in the finished polyurethane fibres was 1 wt. % relative to the solids content of the fibre polymer.

To this spinning solution was added a second stock mixture consisting of 30.9 wt. % of RKB 2 grade titanium dioxide (Bayer AG), 44.5 wt. % of DMAC and 24.6 wt. % of 22% spinning solution in such a manner that a titanium dioxide content of 0.05 wt. %, relative to the polyurethaneurea polymer, was obtained in the finished fibres.

To this spinning solution was added a third stock mixture consisting of 13.8 wt. % of the hydrotalcites and/or metal aluminium hydroxy compounds stated in table 1, 55.2 wt. % of dimethylacetamide and 31.0 wt. % of 30% spinning solution in such a manner that the content of hydrotalcites and/or metal aluminium hydroxy compounds stated in table 1, relative to the polyurethaneurea polymer, was obtained in the finished polyurethane fibres.

A further stock mixture was then mixed into this spinning solution. This consisted of 5.4 wt. % of magnesium stearate, 45.0 wt. % of DMAC and 49.6 wt. % of 30% spinning solution and was added in such a manner that a magnesium stearate content of 0.20 wt. %, relative to the solids content of the fibre polymer, was obtained.

The finished spinning solution was spun through spinnerets in a typical spinning apparatus to yield filaments having a linear density of 10 dtex dry, wherein in each case four individual filaments were combined into coalescing filament yarns. The fibre dressing, consisting of polydimethylsiloxane having a viscosity of 10 mPa.s/25° C., was applied by means of a dressing roller, wherein approx. 4 wt. % were applied relative to the weight of the polyurethane fibre. The polyurethane fibre was then wound at a speed of 900 m/min.

TABLE 1

| Sample | Stabiliser | Added quantity of stabiliser (%) | Stabiliser coating (wt. %) relative to stabiliser | Hot breaking time (blank value, seconds) | Hot breaking time (treatment with perchloroethylene for 2 minutes, seconds) |
| --- | --- | --- | --- | --- | --- |
| I-1 | — | — | — | 22.1 | 7 |
| I-2 | zinc oxide | 3 | — | 20 | 10 |
| I-3 | Mg$_6$Al$_2$(OH)$_{16}$CO$_3$ × 5H$_2$O | 3 | 2% stearic acid | 31 | 37 |
| I-4 | Mg$_6$Al$_2$(OH)$_{16}$CO$_3$ × 5H$_2$O | 0.5 | 5% Baysilone-Öl MH 15 | 22 | 14 |
| I-5 | Mg$_6$Al$_2$(OH)$_{16}$CO$_3$ × 5H$_2$O | 1.5 | 5% Baysilone-Öl MH 15 | 24 | 24 |
| I-6 | Mg$_6$Al$_2$(OH)$_{16}$CO$_3$ × 5H$_2$O | 3 | 5% Baysilone-Öl MH 15 | 26 | 24 |
| I-7 | Mg$_6$Al$_2$(OH)$_{16}$CO$_3$ × 5H$_2$O | 3 | 5% Baysilone-Öl AC 3303 | 27 | 31 |
| I-8 | Mg$_6$Al$_2$(OH)$_{16}$(CO$_3$)$_3$ × 5H$_2$O | 3 | | 28 | 26 |
| I-9 | Mg$_6$Al$_2$(OH)$_{16}$(CO$_3$)$_3$ × 5H$_2$O | 3 | 5% polydimethylsiloxane | 37 | 30 |

It is clear from the Examples stated in table 1 that, by adding coated or uncoated hydrotalcites or magnesium aluminium hydroxy carbonates, the thermal properties of the polyurethane fibres, for example stated by the hot breaking time, remain constant after dry cleaning with, for example, tetrachloroethylene, and no damage occurs.

I claim:

1. Process for the protection of polyurethane fibers against degradation by halogenated, partially halogenated or non-halogenated hydrocarbons, wherein, before the polyurethane is processed into fibers as a melt or as a solution of the polyurethane, there is incorporated into it a quantity of 0.05 to 30 wt. %, relative to the polymer, of finely divided basic metal aluminium hydroxy compounds of the general formula (I)

wherein $M^{2+}$ denotes magnesium or zinc, $A^{n-}$ is an anion of n valency number selected from the group consisting of $OH^-$, $F^-$, $Cl^-$, $Br^-$, $CO_3^{2-}$, $SO_4^{2-}$, $HPO_4^{2-}$, silicate, acetate and oxalate, and $0<x<0.5$ and $0<m<1$.

2. Process for the protection of polyurethane fibers against degradation by halogenated, partially halogenated or non-halogenated hydrocarbons, wherein before the polyurethane is processed into fibers as a melt or as a solution of the polyurethane, there is incorporated into it a quantity of 0.05% to 30 wt. %, relative to the polymer, of finely divided basic metal aluminium hydroxy compounds of the general formula (2)

$$Mg_sAl_t(OH)_u(A^{2-})_v \cdot wH_2O \qquad (2),$$

wherein s is a number from 1 to 15, t is a number from 1 to 8, u is a number from 1 to 40 w is a number from 0 to 20 and v is a number from 1 to 5 and $A^{2-}$ is an anion selected from the group consisting of $CO_3^{2-}$, $SO_4^{2-}$, $HPO_4^{2-}$, silicate and oxalate.

3. Elastane fibers with improved resistance to halogenated, partially-halogenated or non-halogenated hydrocarbons, said elastane fibers being comprised of polymers mixed with finely divided basic metal aluminium hydroxy compounds of the general formula (I)

$$M_{1-x}^{2+}Al_x(OH)_2A_{x/n}^{n-}mH_2O \qquad (1),$$

wherein $M^{2+}$ denotes magnesium or zinc, $A^{n-}$ is an anion of n valency number selected from the group consisting of $OH^-$, $F^-$, $Cl^-$, $Br^-$, $CO_3^{2-}$, $SO_4^{2-}$, $HPO_4^{2-}$, silicate, acetate and oxalate, and $0<x\leq0.5$ and $0\leq m<1$ in an amount of 0.05 to 30 wt. %, by weight of polymer.

4. Elastane fibers with improved resistance to halogenated, partially-halogenated or non-halogenated hydrocarbons, said elastane fibers being comprised of polymers mixed with finely divided basic metal aluminium hydroxy compounds of the general formula (2)

$$Mg_sAl_t(OH)_u(A^{2-})_v \cdot wH_2O \qquad (2),$$

wherein s is a number from 1 to 15, t is a number from 1 to 8, u is a number from I to 40, w is a number from 0 to 20 and v is a number from 1 to 5 and $A^{2-}$ is an anion selected from the group consisting of $CO_3^{2-}$, $SO_4^{2-}$, $HPO_4^{2-}$, silicate and oxalate.

5. Elastane fibers according to claim 4, wherein the metal aluminium hydroxy compound is uncoated or coated with anionic surfactants, with fatty acids, fatty acid salts, silanes, polyorganosiloxanes, polyorganohydrogensiloxanes or higher fatty acid esters.

6. Elastane fibers according to claim 5, wherein said coating is provided in a quantity of 0.1 to 30 wt. % relative to the metal aluminium hydroxy compound.

7. Elastane fibers according to claim 3, wherein said polymers are polyurethanes and the polyurethane fibers are resistant to chlorinated, fluorinated or mixed chlorinated and fluorinated $C_1$ to $C_8$ hydrocarbons.

8. Elastane fibers according to claim 3, wherein the metal aluminium hydroxy compound is uncoated or coated with anionic surfactants, with fatty acids, fatty acid salts, silanes, polyorganosiloxanes, polyorganohydrogensiloxanes or higher fatty acid esters.

9. Elastane fibers according to claim 8, wherein said coating is provided in a quantity of 0.1 to 30 wt.% relative to the metal aluminium hydroxy compound.

10. Elastane fibers according to claim 4, wherein the metal aluminium hydroxy compounds used are those of the formulae (3) or (4)

$$Mg_5Al_3(OH)_{15}(A^{2-})_2 \cdot wH_2O \qquad (3),$$

$$Mg_6Al_2(OH)_{12}(A^{2-})_3 \cdot wH_2O \qquad (4).$$

11. Elastane fibers according to claim 3, wherein said basic aluminum hydroxy compound is a compound of the formulae (5), (6) or (7)

$$Mg_6Al_2(OH)_{16}CO_3 \cdot 5H_2O \qquad (5),$$

$$Mg_2Al_2(OH)_{12}CO_3 \cdot 4H_2O \qquad (6),$$

$$Mg_6Al_2(OH)_{12}(CO_3)_3 \cdot 7H_2O \qquad (7).$$

* * * * *